UNITED STATES PATENT OFFICE.

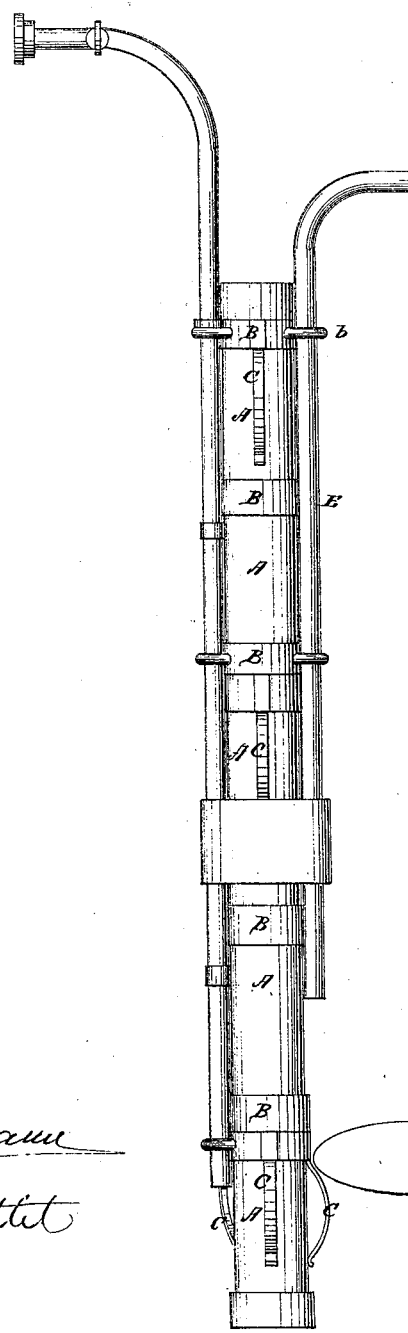

WILLIAM R. HAMILTON, OF OAKLAND, PENNSYLVANIA.

IMPROVEMENT IN TUBE-WELLS.

Specification forming part of Letters Patent No. 101,871, dated April 12, 1870.

*To all whom it may concern:*

Be it known that I, W. R. HAMILTON, of Oakland, in the county of Armstrong and State of Pennsylvania, have invented a new and useful Improvement in Tube-Wells; and I do hereby declare that the following is a full, clear, and exact description of the construction and operation of the same, reference being had to the accompanying drawing, making a part of this specification, in which the figure is a side elevation.

This invention consists of semi-elliptic springs attached lengthwise by means of sliding rings to the tubing of an Artesian well, for the double purpose of steadying the tubing in the well, and sustaining, by their pressure against the sides of the bore, part of the weight of the tubing.

In the drawing, A A, &c., are lengths of tubing screwed together in the usual manner.

B B, &c., are iron rings placed loosely on the tubing, but not large enough to slip over the collars of the latter.

C C, &c., are semi-elliptic springs, attached at their upper ends to the sliding rings B, and bulging to more than the diameter of the bore, so that when placed in the same they may press against its walls with greater or lesser force.

The rings and springs are placed at intervals upon the sections of tubing, as they are successively screwed on at the surface, and sent down into the well with them for the purpose of preventing the tubing from swaying from side to side, and thus injuring the seed-bag by friction against the walls of the well, and loosening the joints, and also to sustain a portion of the weight of the tubing by pressing upon the sides of the bore.

By making use of this device, I am also enabled to dispense with more than one seed-bag, and to make that one short, so that it may be easily turned inside out when the tubing is hoisted. When this operation is performed, the tubing slides the length of the sections in the rings B before its collars start the latter, and in the meantime turns the seed-bag, so that the resistance of the bag and the resistance of the springs C do not both have to be overcome at the same time.

Having thus described my invention, what I claim as new, and desire to secure by Letters Patent, is—

The combination of the tubing A, sliding rings B, and springs C, constructed and arranged to operate in the manner described.

WM. R. HAMILTON.

Witnesses:
CHAS. A. PETTIT,
SOLON C. KEMON.